US009622055B2

United States Patent
Nunally et al.

(10) Patent No.: US 9,622,055 B2
(45) Date of Patent: *Apr. 11, 2017

(54) SYSTEM AND METHOD FOR MANAGING MOBILE COMMUNICATIONS

(71) Applicant: e.Digital Corporation, San Diego, CA (US)

(72) Inventors: Patrick O'Neal Nunally, Escondido, CA (US); Kevin Bostenero, Poway, CA (US); Dustin Cameron Mitchell, Vista, CA (US)

(73) Assignee: e.Digital Corporation, San Diego, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/759,353

(22) Filed: Feb. 5, 2013

(65) Prior Publication Data

US 2013/0150006 A1 Jun. 13, 2013

Related U.S. Application Data

(63) Continuation-in-part of application No. 13/646,158, filed on Oct. 5, 2012, now Pat. No. 9,002,331, which
(Continued)

(51) Int. Cl.
*H04M 3/42* (2006.01)
*H04W 4/16* (2009.01)
(Continued)

(52) U.S. Cl.
CPC .............. *H04W 4/16* (2013.01); *G06Q 50/01* (2013.01); *H04L 67/20* (2013.01); *H04L 67/22* (2013.01);
(Continued)

(58) Field of Classification Search
CPC .................... H04M 2207/18; H04W 84/16
(Continued)

(56) References Cited

U.S. PATENT DOCUMENTS 7,593,740 B2 9/2009 Crowley et al. ........... 455/456.3
7,620,212 B1 11/2009 Allen et al. ................... 382/115
(Continued)

FOREIGN PATENT DOCUMENTS

WO WO2009043020 4/2009

OTHER PUBLICATIONS

Ketabdar, Hamd, "*Using Mobile Phones for Monitoring Physical Conditions,*"Quality and Usability Lab, Deutsche Telekom Laboratories, Berlin, 3 pages.
(Continued)

*Primary Examiner* — Chuck Huynh
(74) *Attorney, Agent, or Firm* — San Diego Patent Prep & Pros, Inc.; Mary Fales

(57) ABSTRACT

A device to automatically provide differing information levels according to a predetermined social hierarchy includes a memory and a processor. The memory stores social templates corresponding to unique social signatures and being selectable to provide, for each level of the predetermined social hierarchy, a corresponding differing amount of information to each member of the predetermined social hierarchy and/or a social networking service. The processor receives sensor data from a sensor set which detects sensor data related to an environment of a communication device, creates a detected social signature from the received sensor data, determines which of the social signatures of the social templates has the greatest correspondence with the created social signature, retrieves from the memory the determined one social template having the greatest
(Continued)

correspondence, and provides only as much information as allowed in the retrieved social template.

24 Claims, 3 Drawing Sheets

Related U.S. Application Data is a continuation of application No. 12/891,875, filed on Sep. 28, 2010, now Pat. No. 8,311,522.

(51) Int. Cl.

| | |
|---|---|
| *G06Q 50/00* | (2012.01) |
| *H04W 4/20* | (2009.01) |
| *H04L 29/08* | (2006.01) |
| *H04W 4/02* | (2009.01) |

(52) U.S. Cl.
CPC ........... *H04L 67/306* (2013.01); *H04W 4/206* (2013.01); *H04M 3/42348* (2013.01); *H04M 2203/655* (2013.01); *H04M 2242/04* (2013.01); *H04M 2242/30* (2013.01); *H04W 4/02* (2013.01)

(58) Field of Classification Search
USPC ............... 455/414.1, 418, 456.1, 550.1, 567; 709/207, 216
See application file for complete search history.

(56) References Cited

U.S. PATENT DOCUMENTS

| | | | |
|---|---|---|---|
| 7,809,805 B2 | 10/2010 | Stremel et al. ............... 709/219 |
| 2004/0043758 A1* | 3/2004 | Sorvari et al. ............. 455/414.1 |
| 2006/0004680 A1 | 1/2006 | Robarts |
| 2006/0085419 A1 | 4/2006 | Rosen |
| 2008/0140650 A1 | 6/2008 | Stackpole |
| 2008/0180243 A1* | 7/2008 | Aaron ........................... 340/540 |
| 2008/0291024 A1 | 11/2008 | Zhang et al. ................. 340/539 |
| 2009/0094179 A1 | 4/2009 | Jager |
| 2009/0170480 A1 | 7/2009 | Lee |
| 2009/0300525 A1 | 12/2009 | Jolliff |
| 2010/0056872 A1 | 3/2010 | Kahn et al. .................... 600/300 |
| 2010/0142715 A1 | 6/2010 | Goldstein et al. .............. 381/56 |
| 2010/0232653 A1* | 9/2010 | Muquit .................... G06F 21/32 382/116 |
| 2010/0275129 A1 | 10/2010 | Besecker |
| 2010/0294938 A1 | 11/2010 | Alameh et al. ............... 250/342 |
| 2010/0299615 A1 | 11/2010 | Miluzzo |
| 2011/0273378 A1 | 11/2011 | Alameh et al. ............... 345/173 |
| 2012/0213212 A1 | 8/2012 | Moore et al. ................. 370/338 |
| 2014/0187190 A1* | 7/2014 | Schuler ................... H04L 63/10 455/404.1 |

OTHER PUBLICATIONS

U.S. Appl. No. 13/646,158, filed Oct. 2012, Nunally, e.Digital Corporation.
U.S. Appl. No. 13/681,054, filed Nov. 2012, Nunally, e.Digital Corporation.
Facebook Help Center page on Places. http://www.facebook.com/help/?page=1080. Retrieved on Sep. 28, 2010.
Ketabdar, Hamed, "Using Mobile Phones for Monitoring Physical Conditions", Quality and Usability Lab, Deutsche Telekom Laboratories, Berlin, 3 pages.
U.S. Appl. No. 12/891,875, filed Sep. 28, 2010, Patrick Nunally, e.Digital Corporation.
U.S. Appl. No. 13/047,163, filed Mar. 14, 2011, Patrick Nunally, e.Digital Corporation.
U.S. Appl. No. 13/047,206, filed Mar. 14, 2011, Patrick Nunally, e.Digital Corporation.
U.S. Appl. No. 13/047,290, filed Mar. 14, 2011, Patrick Nunally, e.Digital Corporation.
U.S. Appl. No. 13/047,306, filed Mar. 14, 2011, Patrick Nunally, e.Digital Corporation.
U.S. Appl. No. 13/047,420, filed Mar. 14, 2011, Patrick Nunally, e.Digital Corporation.
U.S. Appl. No. 14/328,405, filed Jul. 10, 2014, Patrick Nunally, e.Digital Corporation.
"Multi-Sensor Context-Awareness in Mobile Devices and Smart Artefacts" by Gellersen et al., ("Gellersen"), Mobile Networks and Applications v.7 n.5, p. 341-351, Oct. 2002.
"A Privacy Framework for Mobile Health and Home-Care Systems" by Kotz et al., ("Kotz"), SPIMACS '09 (Nov. 13, 2009).
"Wearable Computing and Contextual Awareness" by T. Starner, ("Starner"), Ph.D. thesis, MIT Media Lab., Apr. 30, 1999.
"Designing for privacy in ubiquitous computing environments" by V. Bellotti and A. Sellen, ("Bellotti"), In Proc. European Conference on Computer-Supported Cooperative Work, Milano, Italy, Sep. 1993.
"On Protecting Private Information in Social Networks: A Proposal" by Luo et al., ("Luo"), Data Engineering, ICDE '09.
"7 Things You Should Know About . . . Microblogging" by Educause Learning Initiative ("ELI"), Jul. 2009.
"A Brief History of Microblogging" by E. Naone ("Naone"), Technology Review 111 (5) 26, 2008.
"Micro-blogging, latest tool in the web" by Sethi, S. K. ("Sethi"), Indian Pediatrics, (46), 188, Feb. 17, 2009.
"Social Connectedness on Facebook—An Explorative Study on Status Message Usage" by Kobler et al. ("Kobler"), in Proceedings of the Sixteenth Americas Conference on Information Systems, Lima, Peru, paper 247, Aug. 12-15, 2010.
"Privacy and Online Social Networking Websites" by Goettke et al. ("Goettke"), in Computer Science 199r: Special Topics in Computer Science Computation and Society: Privacy and Technology, May 14, 2007.

* cited by examiner

SYSTEM AND METHOD FOR MANAGING MOBILE COMMUNICATIONS

CROSS-REFERENCE TO RELATED APPLICATIONS

This application is continuation-in-part of U.S. patent application Ser. No. 13/646,158, filed Oct. 5, 2012, currently pending, which is a continuation of U.S. patent application Ser. No. 12/891,875, filed Sep. 28, 2010 and issued as U.S. Pat. No. 8,311,522. The disclosures of both documents are incorporated herein by reference.

BACKGROUND OF THE INVENTION

1. Field of the Invention

Aspects of the invention relate to automatically determining if an incoming communication is interruptive, and more particularly to the classification of a person's current actions such that selected callers can automatically or manually gauge the intrusiveness of a communication request.

2. Description of the Related Art

The development of pervasive communication technologies has delivered direct access to mobile device users worldwide. While access has given users the convenience of communication at all times, this convenience in many cases is a burden as callers can inadvertently interrupt other activities which socially take precedence. One exemplary example is a phone ringing in the middle of a conversation—socially a person would never interrupt another conversation unless the matter was extremely urgent. The fact that communication requests cannot be socially integrated has made the pervasiveness of communication a burden and has led to ignoring of calls (urgent or not) as well as allowing remote communications to take precedence over local communications.

SUMMARY OF THE INVENTION

According to an aspect of the invention, a device to automatically provide differing levels of information according to a predetermined social hierarchy includes a memory which stores social templates, each social template corresponding to a social signature; and a processor which receives sensor data received from a sensor set which detects sensor data related to an environment of a communication device, creates a detected social signature from the received sensor data, determines which of social templates has the greatest correspondence with the created social signature, retrieves from the memory the determined social template having the greatest correspondence, and provides to at least one member of the predetermined social hierarchy only as much information as allowed under the social hierarchy based on the retrieved social template.

According to an aspect of the invention, the sensor data comprises a location of the communication device; a movement of the communication device; and user social statistics indicating a pattern of interaction between the user of the communication device and the environment of the communication device, and the processor compares the location with map data to determine a map location of the communication device, and creates the detected social signature to include information on the map location of the communication device, the movement being experienced by the communication device, and the environment of the communication device.

According to an aspect of the invention, the levels of the social hierarchy of the related social template include a first social hierarchy level which provides one level of information as selected in the retrieved social template, a second social hierarchy level which provides another level of information as selected in the retrieved social template, and a third social hierarchy level which provides further information as selected in the retrieved social template; and the processor determines a level value of each member by comparing the member with members assigned to having the first social hierarchy level, the second social hierarchy level, and the third social hierarchy level, and provides only as much information as allowed by the determined social hierarchy level.

According to an aspect of the invention, the user social statistics include an amount of light of the environment of the communication device, a sound level of the environment of the communication device, a detected heart rate of a user of the communication device, ultrasound levels of the communication device, infrared levels of the communication device, temperature levels of the communication device, local network/data logging of the communication device, capacitive readings of a touch screen of the communication device, a biometric based upon a user's use of the communication device, data related to the communications by and programs running on the communication device, pressure data of the communication device, magnetic field data of the communication device, proximity data of the communication devices, or combinations thereof.

According to an aspect of the invention, the processor further detects a disparity between the detected social signature and the range of social signatures which can be successfully classified using the determined social template, updates the determined social template such that the social signature of the determined social template successfully classifies the detected social signature where the determined social template can be modified to successfully classify the detected social signature without introducing error. Alternately, the processor creates an alternative social template using at least the detected social signature where the determined social template cannot be modified to successfully classify the detected social template.

According to an aspect of the invention, the processor automatically determines if an incoming communication from a communication requestor is interruptive by, prior to completing the communication, assigning the communication requestor to one of the levels of the social hierarchy, and providing to the communication requestor only as much information as allowed under the social hierarchy based on the retrieved social template.

According to an aspect of the invention, for at least one of the social templates, each level of the related social hierarchy corresponds to a corresponding different social networking service, and the processor automatically provides different updates to each of the social networking services as allowed under the social hierarchy based on the one social template.

According to an aspect of the invention, one of the social networking services is for professional networking, one of the social networking services is for non-professional networking, and one of the social networking services is a microblogging service.

According to an aspect of the invention, for at least one of the social templates, there is a single level of social hierarchy for a social networking service, and the processor automatically provides an update to the social networking services.

According to an aspect of the invention, for at least one of the social templates, there is a single level of social hierarchy for a microblogging service, and the processor automatically provides an update to the microblogging service.

According to an aspect of the invention, at least one of the social templates corresponds to an emergency update, and when the processor detects an emergency situation from the sensor data, the processor automatically provides information related to the emergency to predetermined emergency services, friends and/or family members according to the detected emergency situation.

According to an aspect of the invention, the processor processes the received sensor data to obtain biometric data of a user of the communication device, creates a social signature from the received sensor data and the obtained biometric data, identifies the user according to the obtained biometric data, and retrieves from the memory the determined social template having the greatest correspondence to the created social signature for the identified user.

According to an aspect of the invention, one of the sensors comprises an input device which the user uses to input data, and the processor identifies the user according to a writing pattern of the user while inputting the data.

According to an aspect of the invention, one of the sensors comprises an optical sensor, and the processor identifies the user according to a pattern recognition unique to the user.

According to an aspect of the invention, one of the sensors comprises an audio sensor, and the processor identifies the user according to a speech pattern recognition unique to the user.

According to an aspect of the invention, one of the sensors comprises an Ultra Wideband sensor which provides ranging data regarding the environment, and the processor includes in the social signature a size of the location in which the communication device is found.

According to an aspect of the invention, a communication device to automatically provide differing levels of information according to a predetermined social hierarchy includes a sensor set which detects sensor data related to an environment of the communication device; a memory which stores social templates, each social template corresponding to a social signature; a processor which receives the sensor data received from the sensor set, creates a social signature from the received sensor data, determines which of the social signatures of the social templates has the greatest correspondence with the created social signature, retrieves from the memory the determined social template having the greatest correspondence, and provides to at least one member of the predetermined social hierarchy only as much information as allowed under the social hierarchy based on the retrieved social template; a transceiver which provides communication with respect to external devices, and sends the information based on the retrieved social template under the control of the processor; and a housing which houses the sensor set, the processor, the memory, and the transceiver.

According to an aspect of the invention, the sensor set comprises: a location sensor which senses a location of the communication device; an acceleration sensor which senses movement of the communication device; and one or more sensors which sense an interaction between the communication device and the environment of the communication device, and the processor compares the location with map data to determine a map location of the communication device, and creates the social signature to include information on the map location of the communication device, the acceleration being experienced by the communication device, and the environment of the communication device.

According to an aspect of the invention, the device comprises a mobile device.

According to an aspect of the invention, the levels of the social hierarchy of the related social template include a first social hierarchy level which provides one level of information, a second social hierarchy level which provides another level of information, and a third social hierarchy level which provides a different level of information; and the processor determines a level value of each member by comparing the member with members assigned to having the first social hierarchy level, the second social hierarchy level, and the third social hierarchy level, and provides only as much information as allowed by the determined social hierarchy level.

According to an aspect of the invention, the first social hierarchy level provides information including a desired contact state, the map location and the environment, the second social hierarchy level provides information including the desired contact state and the environment but not the map location, and the third social hierarchy level provides information on only the desired contact state.

According to an aspect of the invention, the sensor set further comprises an optical sensor which detects an amount of light of the environment of the communication device, and an acoustic sensor which detects a sound level and/or characteristics of the environment of the communication device.

According to an aspect of the invention, the processor automatically determines if an incoming communication from a communication requestor being received through the transceiver is interruptive by, prior to completing the communication, assigning the communication requestor to one of the levels of the social hierarchy, and providing to the communication requestor only as much information as allowed under the social hierarchy based on the retrieved social template.

According to an aspect of the invention, for at least one of the social templates, each level of the related social hierarchy corresponds to a corresponding different social networking service, and the processor automatically provides different updates to each of the social networking services as allowed under the social hierarchy based on the one social template.

According to an aspect of the invention, one of the social networking services is for professional networking, one of the social networking services is for non-professional networking, and one of the social networking services is a microblogging service.

According to an aspect of the invention, for at least one of the social templates, there is a single level of social hierarchy for a social networking service, and the processor automatically provides an update to the social networking services.

According to an aspect of the invention, for at least one of the social templates, there is a single level of social hierarchy for a microblogging service, and the processor automatically provides an update to the microblogging service.

According to an aspect of the invention, at least one of the social templates corresponds to an emergency update, and when the processor detects an emergency situation from the sensor data, the processor automatically provides information related to the emergency to predetermined emergency services, friends and/or family members according to the detected emergency situation.

According to an aspect of the invention, the processor processes the received sensor data to obtain biometric data of a user of the communication device, creates a social signature from the received sensor data and the obtained biometric data, identifies the user according to the obtained biometric data, and retrieves from the memory the determined social template having the greatest correspondence to the created social signature for the identified user.

According to an aspect of the invention, the sensor set comprises an input device which the user uses to input data, and the processor identifies the user according to a writing pattern of the user while inputting the data.

According to an aspect of the invention, one of the sensors comprises an optical sensor, and the processor identifies the user according to a pattern recognition unique to the user.

According to an aspect of the invention, one of the sensors comprises an audio sensor, and the processor identifies the user according to a speech pattern recognition unique to the user.

According to an aspect of the invention, one of the sensors comprises an input device which the user uses to input data, and the processor detects a status of the communication device according to use or non-use of the input device.

According to an aspect of the invention, the input device comprises a touch screen display including a capacitive sensor, and the processor detects a status of the communication device according to changes in a capacitance detected by the capacitive sensor.

According to an aspect of the invention, one of the sensors comprises an Ultra Wideband sensor which provides ranging data regarding the environment, and the processor includes in the social signature a size of the location in which the communication device is found.

According to an aspect of the invention, a server in communication with a communication device via a network and which automatically provides differing levels of information according to a predetermined social hierarchy includes a memory which stores social templates, each social template corresponding to a social signature; a processor which receives from the communication device sensor data received from a sensor set of the communication device which detects sensor data related to an environment of the communication device, creates a social signature from the received sensor data, determines which of the social signatures of the social templates has the greatest correspondence with the created social signature, retrieves from the memory the determined social template having the greatest correspondence, and provides to at least one member of the predetermined social hierarchy only as much information as allowed under the social hierarchy based on the retrieved social template; and a transceiver which receives the sensor data from the sensor set in the communication device, and provides under the control of the processor to at least one of the members of the predetermined social hierarchy only as much information as allowed under the social hierarchy based on the retrieved social template.

According to an aspect of the invention, the sensor data comprises a location of the communication device, movement of the communication device, and an interaction between the communication device and the environment of the communication device, and the processor compares the location with map data to determine a map location of the communication device, and creates the detected social signature to include information on the map location of the communication device, the movement being experienced by the communication device, and the environment of the communication device.

According to an aspect of the invention, the levels of the social hierarchy of the related social template include: a first social hierarchy level which provides information including a desired contact state, the map location and the environment, a second social hierarchy level which provides information including the desired contact state and the environment but not the map location, and a third social hierarchy level which provides information on only the desired contact state; and the processor determines a level value of each member by comparing the member with members assigned to having the first social hierarchy level, the second social hierarchy level, and the third social hierarchy level, and provides only as much information as allowed by the determined social hierarchy level.

According to an aspect of the invention, the sensor data comprises optical information from an optical sensor which detects an amount of light of the environment of the communication device, and acoustic information from an acoustic sensor which detects a sound level of the environment of the communication device.

According to an aspect of the invention, the processor automatically determines if an incoming communication from a communication requestor being received through the transceiver is interruptive by, prior to completing the communication, assigning the communication requestor to one of the levels of the social hierarchy, and providing to the communication requestor only as much information as allowed under the social hierarchy based on the retrieved social template.

According to an aspect of the invention, for at least one of the social templates, each level of the related social hierarchy corresponds to a corresponding different social networking service, and the processor automatically provides different updates to each of the social networking services as allowed under the social hierarchy based on the one social template.

According to an aspect of the invention, one of the social networking services is for professional networking, one of the social networking services is for non-professional networking, and one of the social networking services is a microblogging service.

According to an aspect of the invention, for at least one of the social templates, there is a single level of social hierarchy for a social networking service, and the processor automatically provides an update to the social networking services.

According to an aspect of the invention, for at least one of the social templates, there is a single level of social hierarchy for a microblogging service, and the processor automatically provides an update to the microblogging service.

According to an aspect of the invention, at least one of the social templates corresponds to an emergency update, and when the processor detects an emergency situation from the sensor data, the processor automatically provides information related to the emergency to predetermined emergency services, friends and/or family members according to the detected emergency situation.

According to an aspect of the invention, the processor processes the received sensor data to obtain biometric data of a user of the communication device, creates the detected social signature from the received sensor data and the obtained biometric data, identifies the user according to the obtained biometric data, and retrieves from the memory the determined one social template having the greatest correspondence to the detected social signature for the identified user.

According to an aspect of the invention, the sensor set comprises an input device which the user uses to input data, and the processor identifies the user according to a writing pattern of the user while inputting the data.

According to an aspect of the invention, one of the sensors comprises an optical sensor, and the processor identifies the user according to a pattern recognition unique to the user.

According to an aspect of the invention, one of the sensors comprises an audio sensor, and the processor identifies the user according to a speech pattern recognition unique to the user.

According to an aspect of the invention, one of the sensors comprises an input device which the user uses to input data, and the processor detects a status of the communication device according to use or non-use of the input device.

According to an aspect of the invention, the input device comprises a touch screen display including a capacitive sensor, and the processor detects a status of the communication device according to changes in a capacitance detected by the capacitive sensor.

According to an aspect of the invention, one of the sensors comprises an Ultra Wideband sensor which provides ranging data regarding the environment, and the processor includes in the social signature a size of the location in which the communication device is found.

According to an aspect of the invention, a method of automatically providing differing levels of information according to a predetermined social hierarchy includes: constructing a social signature using sensor data sensed by a sensor set in a communication device; determining which one of a plurality of social templates has a greatest correspondence with the constructed social signature, each social template corresponding to a social signature; retrieving from a memory the determined social template having the greatest correspondence; and providing to at least one member of the predetermined social hierarchy only as much information as allowed under the social hierarchy based on the retrieved social template.

According to an aspect of the invention, the social signature includes a location of the communication device, a movement of the communication device, and user social statistics indicating a historical interaction between the communication device and the environment of the communication device, and the constructing the social signature comprises comparing the location with map data to determine a map location of the communication device, and creating the social signature to include information on the map location of the communication device, the movement being experienced by the communication device, and the environment of the communication device.

According to an aspect of the invention, the method further includes detecting an incoming communication from a communication requestor; and prior to completing the communication, assigning the communication requestor to one of the levels of the social hierarchy, and providing to the communication requestor only as much information as allowed under the social hierarchy based on the retrieved social template.

According to an aspect of the invention, the providing comprises providing an update to a social networking service as allowed under the social hierarchy based on the retrieved social template.

According to an aspect of the invention, the providing comprises providing a different update to another social networking service as allowed under the social hierarchy based on the retrieved social template.

According to an aspect of the invention, the providing comprises providing an update to a microblogging service as allowed under the social hierarchy based on the retrieved social template.

According to an aspect of the invention, the method further includes detecting an emergency situation from the sensor data, wherein the providing comprises automatically providing information related to the emergency to predetermined emergency services, friends and/or family members according to the detected emergency situation using one of the social templates.

According to an aspect of the invention, the method further includes obtaining biometric data using the sensor data; and identifying a user of the communication device according to the obtained biometric data, wherein the determining comprises determining the social template having the greatest correspondence for the identified user.

According to an aspect of the invention, a computer readable medium is encoded with processing instructions to implement the method executed by one or more processors.

A system to automatically provide suggestions to a user may comprise a communication device comprising a sensor set which detects sensor data related to an environment of the communication device, the device supplying information based on the detected sensor data; a memory which stores social templates, each social template corresponding to a unique set of social signatures; and one or more processors which receive the information based on the detected sensor data, create a social signature from the received information, determine which of the stored social templates has a greatest correspondence with the created social signature, and performs one or more operations based on the determined social template.

According to an aspect of the invention, a system to provide identification of an individual may comprise a communication device comprising a sensor set which detects sensor data related to an environment of the communication device, the device supplying information based on the detected sensor data; a memory which stores social templates, each social template corresponding to a unique set of social signatures; and one or more processors which receive the information based on the detected sensor data, create a social signature from the received information, determine which of the stored social templates has a greatest correspondence with the created social signature, and calculates a metric of identification of an individual in the environment of the communication device.

According to an aspect of the invention, a method for service delivery may comprise detecting sensor data; representing the detected sensor data in a social signature; processing one or more social signatures using at least one of a plurality of related social templates; successfully classifying one or more activities represented in at least one social signature; and responding to the successful classification of a social signature based in part on information associated with the social template used in the successful classification of the social signature.

According to an aspect of the invention, a set of microprocessor instructions, stored in a non-transitory memory, enabling the automatic provision of services to a user based upon an analysis of an environment, may comprise a social signature module to accept detected sensor data and create social signature based upon the detected sensor data, where each social signature is represents a set of detected sensor data; and a social template module to accept the created social signature, access a plurality of social templates stored in a memory, classify the social signature, and execute one or more operations initiated by the successful classification of one or more social signatures.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
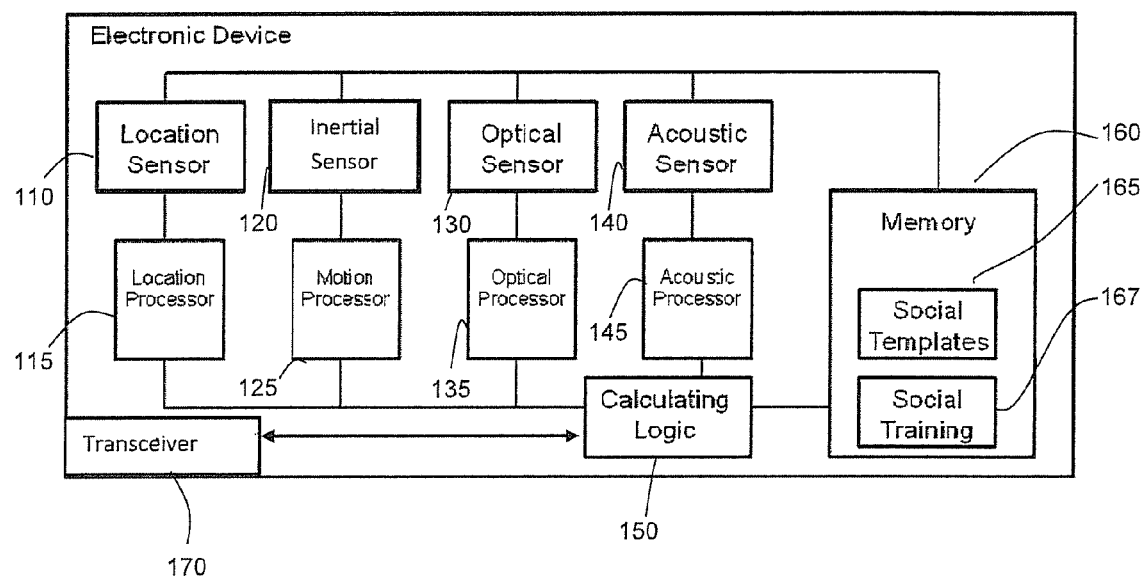
FIG. 1 is a block diagram illustrating an electronic device, in accordance with one embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Embodiments of the present invention are designed to monitor social activity using multiple data sources. In the embodiment shown in FIG. 1, a mobile device 100 monitors location, acceleration, orientation, audio and optical samples using a set of sensors which over time can be used to create one or more social statistics. In the shown example, the sensor set includes sensors 110, 120, 130, 140 included in the mobile device 100. A user's activity may be classified based on one or more social statistics obtained over time from the sensors 110, 120, 130, 140 identification of location, acceleration, orientation, audio and optical samples, in addition to other possible collected information such as purchasing data or ranging data, as well as static and/or dynamic classification rules. Examples of user activities include driving, napping, in a meeting, showering, etc. While shown as incorporated into the body of the mobile device 100, it is understood that one or more of the sensors 110, 120, 130, 140 can be connectable to the mobile device 100 using wired and/or wireless communication, such as where a camera or headset is connected using a Bluetooth connection. It is also understood that, although the term "mobile device" is used for convenience, non-mobile communication devices may also be used in some embodiments of the invention, as will be clear in the description to follow.

For instance, a first calculation is made of a user's location and the position of the mobile device 100 using a GPS statistic associated with the user's location detected from the location sensor 110, and local measurements of accelerometers included in the inertial sensor 120. Location information is obtained by the location sensor 110. In the shown mobile device 100, additional user social statistics are accumulated using the optical sensor 130 and the acoustic sensor 140, which collect additional information relevant to an interaction between the environment of the mobile device 100 and the mobile device 100.

While the user social statistics are shown based on the sensors 110, 120, 130, 140, it is understood that the user social statistics can include other types of information in addition to or instead of information from one or more of these sensors 110, 120, 130, 140. For instance, the information can be from other sensors including but not limited to sensors which detect heart rate, ultrasound sensors, infrared sensors, temperature sensors, pressure sensors, magnetic field sensors, proximity sensors, and other environmental sensors which detect a user environment, or combinations thereof. Yet other information may include but is not limited to application usage or other computer data. The information may also be provided directly by an individual or other device.

While not shown, in other aspects of the invention, the social statistics can include local network/data logging which records network signal characteristics through the course of a day. Such logging could include detection of Near Field Communication (NFC), Bluetooth, WiFi or other short range communication networks. In this way, a social signature might become associated with specific mobile devices and networks in particular locations and times in order to help identify that, when these combinations of networks are detected, a particular social template is to be used. For instance, if one of the detected mobile devices corresponds to logging associated with a particular friend, one social template might be chosen in preference to another social template, the chosen template being more willing to allow communication if the user is sensed to be alone.

While not shown, in other aspects of the invention, the social statistics can include sensing a touch screen. The touch screen is a capacitive interface, and therefore if there is no capacitive reading, it might indicate that the mobile device 100 is not exposed or being held (example, in a backpack or drawer). In contrast, if the capacitive reading is low, the level might indicate that the mobile device 100 is in a pocket or being held. Similarly, at other capacitive readings, this would be indicative that the user is actively using the mobile device 100. The level of the capacitive reading would therefore be usable in the social signature in aspects of the invention.

In other aspects of the invention, the social statistics can include a biometric based upon a user's use of the mobile device 100. The biometric could be used to identify the user, and thus verify which user is using the mobile device 100. Such biometrics could be obtained from specific sensors, or through combinations of sensors used for other purposes and whose output is further processed. By way of example, the biometric could be based upon an analysis of patterns obtained through the optical sensor 130 and the acoustic sensor 140 as analyzed by the processors 135, 145 and/or the calculating logic 150.

An example of a biometric is based upon patterns specific to a user's inputting of data. For instance, for a touch screen or a keyboard, people tend to have the same rate of time between certain actions and tend to make the same input errors again and again. Time is the key distinguishing element in this biometric. For instance, when inputting, three different letters (example JIM), the user will type certain words with a proportional time between each key stroke (i.e., J <21 ms> I <55 ms> M). While the time may vary, the fact that the time between J and I will be roughly half that of the time between I and M will be generally constant for that user. In contrast, a different user will have different timings between each letter pair. However, it is understood that other biometrics could be used, such as user name and passwords, retina and/or fingerprint recognition, facial and motion recognition techniques, voice, hand geometry, and other mechanism by which a particular user is identified based upon that user's characteristics. Such biometrics could be detected using combinations of the sensors 110, 120. 130, 140, or through use of additional sensors. The use of a biometric can be useful in confirming who you are communicating with as the mobile device 100 can be used by multiple users, and therefore would be usable in the social signature in aspects of the invention.

It is noted that usage of the mobile device 100 can also be used in the social statistic as a form of sensor data. In these instances, the usage could be detected by an element being used acting as a sensor (e.g., the calculating logic 150 performing an operation, a transceiver 170 performing a communication operation, and/or an input device receiving information), and the resulting usage data being included in the sensor data to create a social signature.

For instance, the usage data can be communications by and programs running on the mobile device 100 and would be sensed by the calculating logic 150, whereby the calculating logic 150 would be a type of sensor for purposes of forming a social signature. As another example, where the mobile device 100 is linked to a Bluetooth headset, this communication status could be detected by a transceiver 170 and/or the calculating logic 150 as a form of sensor data, and the sensor data could be used in the social statistic. Similarly, where the user is running an email program, a game program, or a media program, this usage data could be detected by the calculating logic 150 as a sensor and the usage data included in the sensor data could be used in the social statistic. Moreover, where a transaction is being processed (such as the purchase of an item) or the user is using an input device (such as a key board, touch screen display, joystick, and/or clickwheel), this usage data may be detected by the calculating logic 150 and/or input device as a sensor and indicate that the user is available for certain types of calls. Thus, the operations of the mobile device 100 itself could furnish information as part of the social statistics.

A second calculation can be made of the user social statistic based on the static and/or dynamic rule set. The user's social classification may be calculated based on the first calculation, the second calculation, and a preset reporting level which offers a specific hierarchical level of social classification based on the caller.

Calculation of a social statistic may be performed in whole or in part by the mobile device or by a remote server. The mobile device 100 may be a cellular phone, wrist watch, mp3 player, portable media player, personal digital assistant (PDA), mobile game console, laptop computer, or any other device which can support an set of sensors and be carried by a user. In the embodiment shown in FIG. 1, the mobile device 100 is a portable electronic device that includes one or more inertial sensors 120, one or more location sensors 110, one or more audio sensors 140 and one or more optical sensors 130.

The location sensor 110 can include a single location sensor, or multiple location sensors. Where there are multiple location sensors, the sensors can be of the same type to provide redundancy, or of multiple different types of location sensors to provide location information in case one type of signal is not working. The location sensor 110 provides the location information to a location processor 115.

In one embodiment, the location sensor 110 includes a global positioning system (GPS) sensor comprising a GPS antenna and a GPS receiver. The GPS sensor obtains location information from one or more GPS satellites, which are received at the GPS antenna and processed using the GPS receiver.

In one embodiment, the location sensor 110 includes a network localization sensor. A network localization sensor determines a position by receiving signals from multiple sources that have known locations, and calculating the position based on the combined signals using trigonometric relations. The signals used to determine location may be radio frequency (RF) signals formatted according to the Bluetooth protocol, Zigbee protocol, wireless fidelity (WiFi) protocol, global system for mobile communications (GSM) protocol, 3G mobile communications protocol, etc. For example, a first network localization sensor may perform network triangulation using signals received from a mobile phone service provider's cell towers. In another example, a second network localization sensor may perform triangulation using wireless fidelity (WiFi) signals received from multiple nearby WiFi access points (e.g., hotspots).

In one embodiment, the location sensor 110 includes a radio frequency identification (RFID) reader that reads transponders (e.g., passive integrated transponders (PITs)). Each transponder may report a specific location. When, for example, a transponder that reports location A is read, the location sensor knows to a high degree of certainty that the electronic device is at location A.

Alternatively, the location sensor 110 may itself include a PIT that is read by an RFID reader at a known location. Upon the PIT being read by a particular RFID reader having a known location, the location sensor may learn its current location.

As noted above, the location sensor 110 can comprise a system of multiple location sensors which may be used separately or together. When used separately, each location sensor may independently determine a location of the electronic device, and report the location to the location processor 115. When used together, the capabilities of one location sensor 110 can be used to augment the capabilities of another location based sensor. Examples of such cooperative use of location sensors include assisted GPS and enhanced GPS, in which location data reported by a network localization sensor is used to augment a GPS sensor and to reduce the time and processing effort needed to quickly identify a location. A single location may then be reported to the location processor 115.

The location sensor 110 may generate location information continuously, or at a sampling rate that may be fixed or variable. In one embodiment, the location sensor 110 receives a timing signal from a timer (not shown) to take measurements at the sampling rate. The location sensor 110 may obtain location measurements at a sampling rate that is the same as or different from the sampling rate at which the inertial sensor 120 collects acceleration measurement data. In this manner, the mobile device 100 can collect instantaneous accelerations from the acceleration measurement data measured by the inertial sensor 120, as well as long term accelerations using the differences in the location measurements measured by the location sensor 110.

The one or more location sensors 110 can report a position of the electronic device 100 as a latitude and longitude, and may report a horizontal accuracy. In one embodiment, the horizontal accuracy of the location is reported as a confidence radius. For example, a location may be reported with a horizontal accuracy of 3 m, meaning that the reported location is accurate within a circle having a 3 m radius. Accuracy of the location may vary from about 1 m to about 100 m for location data obtained by a GPS sensor, depending on user location (e.g., in a city, under open sky, under a tree, in a building, etc.). The location information may further include an altitude, and may include a vertical accuracy. The location information may also include a time that the location was recorded.

In a one embodiment, the location sensor 110 is coupled to a mapping processor included in the location processor 115. The mapping processor processes location measurement data received from the location sensor 110 to provide data used to identify a social classification of a person to whom communication is desired. For instance, in an aspect of the invention, the mapping processor can compare the sensed location with known locations in the user's address book or contact list to determine the location (i.e., at home, at a dentist office, at work). Additionally, in other aspects, the mapping processor can compare the sensed location with a map stored in the mobile device 100 or retrieved from a query to an internet service such as MapQuest or Google maps, and determine the location as being a restaurant, store, office or other like location according to such publicly available information.

The inertial sensor 120 may measure accelerations along a single axis or multiple axes, and may measure linear as well as rotational (angular) accelerations. In one embodiment, one or more inertial sensors 120 together provide three dimensional acceleration measurement data so as to indicate the instantaneous motion of the mobile device 100, and hence given an indication as to the motion of the user of the mobile device 100. The inertial sensor 120 may generate acceleration measurement data continuously, or at a sampling rate that may be fixed or variable. In one embodiment, the inertial sensor 120 receives a timing signal from a timer (not shown) to take measurements at the sampling rate. The inertial sensor 120 provides the acceleration measurement data and/or movement data to a motion processor 125.

However, it is understood that the functionality of the inertial sensor 120 can be estimated, such as where the overall motion or movement is detected using differences in location sensed by the location sensor 110. Conversely, where the location is not known due to a lack of a signal to the location sensor 110 or where the location sensor 110 is not included, the inertial sensor 120 can be used to estimate the location of the mobile device 100 relative to a known starting point. The known starting point can be set by the user, or sensed from a communication from known access points and networks having a known location.

In one embodiment, the inertial sensor 120 is coupled to the motion processor 125. The motion processor 125 processes acceleration measurement data received from the inertial sensor 120 to provide data used to provide a social signature of the user and/or as a biometric. For instance, specific patterns of acceleration might indicate specific activities (sleeping versus running versus walking), and the rhythm of such movement could also indicate the user to the extent the user's accelerations provide a unique pattern.

The optical sensor 130 may generate simple light level measurement data continuously, or at a sampling rate that may be fixed or variable. The optical sensor 130 provides the light level measurement to an optical processor 135. While not required in all aspects, the optical sensor 130 can be a camera (still or video) as used in mobile phones.

In one embodiment, the optical sensor 130 includes charged coupling device (CCD) sensors, whereby image data is sampled by the CCD sensors and is used to better classify the social situation and preprocessing of the optical signal using signal processing techniques can be used to simply classification calculations. For instance, if the CCD sensors detect a low level of light, the mobile device 100 can determine that the mobile device 100 is in a dark location (such as in a pocket, in a room with the lights off, or outside during the night). Whereas if the CCD sensors detect the high level of light, this could indicate that the mobile device 100 is in use or is merely exposed in a room with the lights on or is outside during the daytime. While described in terms of the visible light, the optical sensor 330 could also be a type of camera which detects non-visible light spectra, such as infrared or ultraviolet detectors, or other radiation and energy detectors.

In one embodiment, the optical sensor 130 is coupled to an optical signal processor included in the optical processor 135. The optical signal processor processes optical samples of data received from the optical sensor 130 to provide data used to identify a social classification of a person to whom communication is desired.

The acoustic sensor 140 may generate acoustic measurement data continuously, or at a sampling rate that may be fixed or variable. In one embodiment, multiple acoustic sensors are used to filter noise from relevant acoustic signals and preprocessing of the acoustic signal using signal processing techniques can be used to simplify classification calculations. Examples of the acoustic sensor 140 include a microphone or like mechanism which detects acoustics and sounds. The acoustic sensor 140 provides the detected acoustics and sound to an acoustic processor 145.

In one embodiment, the acoustic sensor 140 is coupled to an acoustic signal processor included in the acoustic processor 145. The acoustic signal processor processes acoustic samples of data received from the acoustic sensor 140 to provide data used to identify a social classification of a person to whom communication is desired.

In one embodiment, a combination of any inertial sensor 120 coupled to the motion processor, the location sensor 110 coupled to the mapping processor, the acoustic sensor 140 coupled to the acoustic signal processor and/or the optical sensor 130 coupled to the optical signal processor is used to provide data used to identify a social classification of a person to whom communication is desired.

In one embodiment, a combination of any inertial sensor data, location sensor data, acoustic sensor data and/or an optical sensor data is formatted for processing at a location other than the mobile device 100 and subsequently used to identify a social classification of a person to whom communication is desired. In this manner, the mobile device 100 needs to devote less processing time and energy to perform such social classification and relies upon an outside computational device to provide such functionality.

In one embodiment of the invention, the social statistics information can include Ultra Wideband sensor data which can provide ranging data, such as occurs with radar. In this manner, the ranging data could provide a 3D image of the room in which the mobile device 100 is located, and/or provide simple room size and obstacle location measurements. The use of the ranging data would be usable in the social signature in aspects of the invention. By way of example, the ranging data could be usable in the social signature when combined with the map location detected from the mapping processor the location on a map, thereby allowing a social template to be constructed to provide information based both upon map location and a location relative to walls of a specific room in that location.

In the embodiment shown in FIG. 1, the social classification is performed in the mobile device 100. Specifically, a calculating logic 150 receives the processed data from the location processor 115, the motion processor 125, the optical processor 135, and the acoustic processor 145, among other information such as purchasing or ranging data, and compares the processed data with social templates 165 stored in a memory 160 included in the mobile device 100. The memory 160 can be removable or permanently installed in the mobile device 100. The calculating logic 150 provides the result of the comparison to a requesting caller using a transceiver 170 via a network according to a hierarchical social classification. While shown as included in the device 100, it is understood that the transceiver 170 can be removable from the device 100.

Examples of hierarchical social classification that can be identified include high level classifications such as "available", "busy", and/or "do not disturb". Under each of these broad classifications can be more accurate classifications which are potentially available to a more select social group. For example, under the hierarchical tree, "do not disturb" can be divided into classifications such as "at the dentist", "sleeping", and/or "with a customer". While a caller may still choose to advance the call upon notice of the classification, they will do so being able to socially weigh the urgency of the communication against the social classification of the user being contacted. Each set of hierarchical classifications can be used to further refine or build new templates associated with more accurate classifications.

The calculating logic 150 can further use the data from the processors 115, 125, 135, 145 to classify a current user's activity from a plurality of predefined identifiable user activities as well as trained user activities. In one embodiment, the calculating logic 150 identifies a user's social activity by monitoring for different social signatures, and applies a corresponding social template to determine how to treat an incoming communication request.

In one embodiment, when enough events indicative of a particular user social activity are detected, the calculating logic 150 identifies the activity as being performed by the user. In one embodiment, events may include positive events (ones that must be met to classify a social state in a certain way) and negative events (ones that indicate that a social state cannot be classified in a certain way). For instance, where a user is classified as entering a coffee shop at 7:32 am which is his normal routine, the classification can be made that he is on his way to work and has a 97% probability of arriving on time at 8:02 am according to the corresponding social template. However, in this instance, he orders two coffees and arrives at work at 8:20 am. This deviation is a negative event from the classification of the coffee ordering time to the arrival at work, and a positive event from the classification of the number of coffees ordered as well as time to the user's arrival time at work.

Once the system has identified a user activity, the system may apply a set of motion criteria specific to the identified social state to estimate one or more user social statistics (e.g., to detect intrusiveness of a communication request). Social state criteria may include thresholds, comparison requirements, action windows, etc. For instance, in relation to the coffee shop example above, the comparison may be looking at the purchase amount, audio input and physical location in comparison to typical actions to say socially that the user is having a tall, soy latte with a friend at the coffee shop. This may however not be what is reported to everyone depending on the social template and social hierarchy. Thus, the social template is used by the system and may allow specific friends to know that he is drinking coffee at the coffee shop, may allow his co-workers to know that he is in a personal meeting, and only allow the rest of the world to know that he is busy and should not be disturbed. These would be examples of social grouping where a single event would be reported in multiple ways based on where the requestor fit in this user's social hierarchy. So certain social states may cross a threshold of what should be reported to which groups, a comparison of data previously shared versus currently available to be shared may be used, and specific action windows can be used to allow the user to share data after the event so that nothing is provided without knowledge and this becomes the basis of further training.

In one embodiment, the social signature could be used to classify a particular purchasing experience of the user. For instance, a specific location at a specific time (date, day of the week, holiday) could construct a social signature indicative of a shopping experience or a restaurant experience. The identity of the location could be made using map data and/or through a user's address book, and thus the name of the establishment could be found and identified as a location for making purchases. Also, ranging data or sensor data, such as acoustic data and/or optical data and/or ambient temperature, can be used to determine the emotional state (stress level or mood) of the user, which may be consistent with a specific shopping experience. The social signature could also be used to classify a specific product/service/establishment or the class of the product/service/establishment or to exclude certain products/services/establishments to limit the number of possible products/services/establishments being matched.

Moreover, in one embodiment, the acoustic and/or optical sensor data might indicate the type of person accompanying the user (i.e., pitch of voices and/or a facial recognition might indicate a child versus an adult, or a male versus a female, etc.). In an aspect of the invention, the system could identify the specific person if biometric data can be obtained from the acoustic and/or optical signatures. The acoustic data could also be used to detect the type of social situation, such as loud conversations being indicative of a bar, quieter conversations being indicative of a restaurant, and sudden spurts of cheering might indicate a sporting event. As such, these various inputs further clarify a particular social situation beyond merely identifying the location and the specific establishment.

By way of example, where the user brings the communication device into a location which has loud conversations, the communication device could determine the name of the establishment by correlating the location with map data. The loud conversations in correlation with a specific time might indicate different purchasing preferences, and thus result in different purchasing scenarios. For instance, the specific time might be in a range more typical of lunch versus dinner, in a range more typical of happy hour with friends versus dinner, or in a range more indicative of desert versus lunch or dinner. The specific time would be usable in the social signature to select different social templates even in the same establishment. Thus, the social signature could be used to identify the type of shopping, dining, or purchasing experience of the user by applying a social template reflecting this type of experience.

In one embodiment, when a purchasing experience is detected from the social signature, the social template could be used to prevent interruptions or to inform others of the user's activities according to a set social hierarchy. In addition, different social templates could be set up to provide recommendations on possible purchases to the user and/or others in the social hierarchy. Returning to the restaurant example, the social template could be programmed so that it is used by the system to provide to the user a suggestion based upon prior experiences in the same establishment or a common category of establishments. In this manner, the social template, and optionally data on past purchases, could be used to suggest future purchases, and can use this data across categories of establishments. Thus, if the social signature indicates a purchasing experience of purchasing coffee at a coffee shop, and the past purchase data indicates that the user typically wants a cappuccino based upon the location, time, and acoustic data, the social template is used by the system and might suggest to the user to purchase the cappuccino in any establishment when they are in a category of "coffee shop".

Additionally, motion, acceleration, light, temperature, can yield an activity (running, biking, driving, etc.) followed by a food purchase. Then, the next time the activity is pursued, suggestions or coupons related to the food purchase could be offered for a similar purchase.

The purchase data can be captured and stored in the system in many ways. Illustrative examples include, but are not limited to, the purchase data being captured from direct keying of the purchase into the system or from optical character recognition (OCR) of images of prior receipts, or from a history of online purchases, or from transactions made with a mobile device through an electronic wallet application, or from lists indicating what was purchased. The past purchase data could also come through an interface with purchasing recommendation websites, such as where the user has an affinity or loyalty card with a particular establishment which records past purchases, or has signed onto a particular service which records prior purchase history (such as is available on AMAZON or through ITUNES). Such past purchase data could be segregated according to particular establishments or stores, or could be used for establishments or stores having the same basic categories. In this manner, where a user goes to a new restaurant, the user's past purchases in the same basic restaurant category (i.e., Italian food, fast food, etc.) can be used to predict possible purchases at the new restaurant.

In addition to or instead of past purchase data, purchase data could be available based upon third party input, such as is available through social networking sites and/or recommendation websites such as YELP or OPENTABLE. Additionally, purchase data can be made available based upon third party input, such as one or more of a user's contacts, general community, and/or general population having made certain purchases or identification of relative purchase trends/fads, which may influence a user's purchase decision. Conversely, purchase data indicating that no one has made a certain purchase may influence a user's purchase decision. Thus, even when a user has not purchased anything at a particular location, purchase data can be used as part of the social signature which then allows the system to provide suggestions according to a particular social template.

In one embodiment, the suggestion can be coordinated with a particular establishment. Specifically, when the social signature corresponds to the particular establishment, the social template is used by the system and can retrieve from the establishment (such as through a link with the establishment's network or through a connection with the establishment's wireless network) possible specials or sales that would be of interest to the user according to the social template. If the social template includes purchase data (such as past purchase data), the coordination of the social template with what is available as a special at the establishment is used by the system and could forward even more specialized suggestions and specials.

By way of example, if a user has a history of going to one family restaurant at the same time each Friday and always orders Buffalo wings, a social template could be stored which is used by the system to indicate that, on Fridays, the user likes to order buffalo wings. Should the user switch and go to another restaurant one Friday, the system could retrieve the social template corresponding to Friday dining, access the another restaurant's network to identify a similar food to replace the buffalo wings normally ordered at the other family restaurant, or provide specials (such as two for one deals, free samples) to try the new restaurant's take on the same food.

In this embodiment, the establishment would benefit from the exchange by being able to provide the user with a more customized suggestion on specials and potential purchases based upon the user's prior purchasing habits. The establishment would also not have to inconvenience the user by requiring the use of an affinity or loyalty card, and would also not be at risk of inadvertent disclosure of the user's data which would harm the user's privacy. The user would benefit by not having their particular prior purchasing habits stored in individual establishments, which prevents using past purchase history to predict a new dish in other restaurants. Thus, the user would benefit from a centralized collection of this data in the system to allow the user better suggestions which are independent of the individual establishments.

In one embodiment, the social template could also utilize the date, time, and acoustic data to further modify the suggestions. For instance, where the acoustical data indicates cheering (sudden spurts of loud sounds) instead of conversation, the social signature might correspond more closely to a social template for watching a sporting event or attending a party than going to dinner, and the suggestion might be for an appetizer which can be shared (buffalo wings, chips), as opposed to a meal. Similarly, where the time indicates lunch instead of dinner, the suggestion based on the social template might be for a sandwich and chips instead of for a meal and appetizer, as might be suggested for a social template corresponding to dinner. Moreover, where the acoustic signature indicates a child is present, the social template more closely associated with this social signature might be for a meal with a child, and thus the suggestion might include treats such as ice cream, or cookies, or special children's meals. As such, the system could use social templates in cooperation with a restaurant's network to provide individual and customized suggestions which are context specific.

In one or more embodiments, the social template can utilize the historical continuity and/or patterning of sensor data as a basis for identification of a user. For example, in one or more embodiments, the system might determine identification based on one or more retail transactions, financial service transactions, or data transactions; or attempts to access a physical location, data access, or other authorization, or some combination of one or more of the above. Similarly, the identification might be reported to a retail service provider, a financial services provider, or a data services provider; or a system controlling access to a physical location, access to data, or permissions, or some combination of one or more of the above. Yet other information for identification, and other recipients of the identification, are also possible and will be elaborated on below, or will be understood as options by those of skill in the art.

For example, where the historical data indicates a consistency with the user's location of waking, morning routine, and the location of their normal coffee purchase on the way to their office, then troubling the user for PIN numbers, passwords, or identification is effectively redundant. As mobile devices are increasingly being used as mobile wallets, the social signature in light of one or more social templates can be utilized as a passive means of verification of identity. Unauthorized users will not be able to match the patterns of usage and this identification can be made well in advance of a required validation. In the case where a mobile device is used in a way that is inconsistent with earlier patterns of use, then secondary means of user identification can be triggered.

In one embodiment, a mobile device user can make a purchase via the Internet using a charge card for the transaction. Validation of the user's identification can be accomplished by processing of one or more social signatures and/or social statistics consistent with that user. This passive identification method can be used to prevent identify theft as well as numerous other types of fraud.

In one embodiment, assuming a husband is purchasing a gift for his wife for an event stored in the server or communication device (such as an upcoming birthday, holiday or anniversary), a social template could be created that the system can use to suggest different gift options based upon the identified store and the event as identified from the time. Some examples of such suggestions could be for a particular bouquet of flowers for his wife's birthday, a book based upon a past purchase of a related movie or book, music based upon suggestions from third parties, etc.

Thus, by incorporating purchasing data in the social signature and using the social template to link the social signature with purchases available at a particular establishment, the establishment is able to provide customized specials, advertising and suggestions to the user without having the user sign up for an affinity or loyalty card or otherwise storing private data of the user. Moreover, by allowing for multiple purchasing scenarios at the same location according to detected sensor data and/or time, the social templates can be refined with particular specials more closely approximating the actual situation and environment of the user in real time.

However, the social template and social signature need not be solely used by the purchaser and can also be used by the establishment in other aspects of the invention. For instance, the mobile device 100 could be an electronic card reader, point of sale terminal, a mobile phone having a point of sale application, and/or menu through which an employee communicates with customers. In this context, the social signature would be used to identify a particular social template so as to suggest particular purchases, sale items, or specials to the customer.

In one embodiment, the mobile device 100 captures the identity of the customer, such as might occur when a purchase of a drink is made, where the customer's affinity or loyalty card is used, where the customer provides information, and/or where the customer is known by the employee of the establishment. Once the customer identity is made, the identity information is used to detect from the establishment's records and/or records of a consolidator (such as a credit card company) to detect the customer's normal purchasing habits and preferences. Alternately, if the customer has a mobile device 100, the customer could allow the system serving the establishment to interact with the system serving the customer's communication device to detect these same elements. As such, a social signature is created which includes the environment of the patron as well as the patron's purchasing preferences in particular settings, and a corresponding social template is used to make suggestions on particular purchases, specials, and/or sales. While not required in all aspects, the use of a consolidator would allow recommendations based upon purchases at other like establishments, which would increase the accuracy of the suggestion.

By way of example, where the user/establishment is a restaurant, when a patron arrives for dinner, the mobile device 100 detects the social signature relating to the time, the patron, and any people accompanying the patron. With this information, the system knows that the patron is in the restaurant on Friday night at 6:30 with his wife and two teenagers. After identifying the patron, the system accesses consolidator data from the consolidator using a network connected to the system, and the system detects that in this scenario, the patron normally goes to another establishment on Friday night with a group where they always order Buffalo wings as an appetizer. The restaurant now applies its own social templates which are used to instruct their waiter via the mobile device 100 to offer them a free Buffalo wings appetizer and direct them to selections that they're likely to enjoy. Such suggestions as a result of using the social template can be based on the restaurant's own algorithm, or based on an algorithm at the consolidator which helps identify like or similar items on the menu. Thus, where the restaurant does not serve Buffalo wings, the social template could suggest another spicy option to try.

In one embodiment, the device 100 could also detect where in the restaurant the patron is located using location data and/or ranging data, so as to distinguish between likely offerings in different areas of the establishment. For instance, this location information could distinguish between a main dining room versus a bar area, or between a men's section of a clothing store and a woman's section of the same store. Moreover, optical and/or acoustic data could be used to distinguish between atmospheres indicating a party or event watching as compared to quieter dining experiences. In this way, the device 100 could automatically account for movement by a waiter or employee between different areas of the establishment as well as to account for the environment actually occurring spontaneously as opposed to events which are planned.

In one embodiment, the system could also be used to eliminate options such that the suggestion is more tailored to a specific purchasing scenario. Returning to the restaurant example, the social signature and the restaurant's/consolidator's data might indicate that the patron in this situation does not like specific condiments like sour cream or mayonnaise on anything. In this manner, the results of using this social template might include this preference such that the waiter can take this preference into account when placing the order of the Buffalo wings or like suggested appetizer.

In one embodiment, the suggestion could be linked to other purchases in other categories. Where the system detects the customer identity and obtains suggestions, the system might use the consolidator to detect purchases having a temporal proximity to the current time which might affect the suggestion. For instance, the system could detect suggested purchases from prior purchases stored in one set of databases, and detect from another set of databases (such as those of a credit card company) that the customer is likely in a rush due to another purchase from an unrelated establishment. In this example, the detection of the need for expedited service can include sharing of the actual detected another purchase, or merely providing an indication that the customer is likely in a rush so as to maintain the privacy of the customer's entire purchasing history. Additionally, temporal proximity may include historical relational suggestions. For instance, a customer's purchase of a swimsuit a length of time (fixed or user specific) since the last purchase of sunscreen might affect a suggested purchase of sunscreen.

Similarly, in a restaurant, the system could detect that the group is likely in a rush based upon information received from a credit card company indicating that the group needs to leave in one hour. The restaurant would not need to know the reason for the departure, which could be for a movie or airplane flight purchased using the credit card from the credit card company, but the restaurant could be given a rush indication where the difference in time between a start time of the ticketed event and a current time is less than a predetermined amount. Conversely, where the group is at the restaurant and arrives with more than enough time to spare before the next purchase, the credit card company would provide a triage indication to the restaurant. The waiter would be informed by the mobile device 100 of the need to rush and the social template could be selected according to a rush or non-rush indication such that the types of appetizers and entree's suggested by the system are compatible with this purchasing scenario. While discussed in the context of using credit card data, it is understood that similar event data could be obtained from a user's system, such as calendars in a user's mobile device or internet account (such as GOOGLE) communicating with the restaurant's system.

Moreover, the establishment could utilize temporally close prior purchases to make suggestions and/or can also automatically make certain orders. Returning to the restaurant example, when the group leaves the restaurant, it goes to a movie theater. The movie theater includes its own system and mobile device 100 which detects, from the tickets, the identity of the patron and the group. The system also detects from its own databases and/or the consolidator that prior purchases at the movie theater involve popcorn with no butter. As such, the social template would be selected so that the system automatically orders the popcorn with no butter so that the purchase is ready when the patron arrives at the counter. The timing of the automatic order could be based upon the known time of the event (i.e., the movie), when the ticket is collected, and/or when the group makes final payment at the restaurant (a time which is relayed to the movie theater via the credit card company).

Moreover, systems of the establishments could provide cross selling opportunities based upon known patterns of the customers. In one such embodiment, the movie theater could enter into a separate contract with the restaurant or other restaurants to provide cross-selling opportunities. For instance, the movie theater system could use a social template which could result in providing coupons for the restaurant or like restaurants based upon the purchase just prior to arriving at the movie theater. Conversely, prior to leaving the restaurant, the restaurant system could use a social template which could result in providing suggested movies at the movie theater based upon the recent purchase and/or a offer coupon for the popcorn. Thus, aspects of the invention allow for specific cross selling opportunities using the detected social signature of the customer in particular purchasing situations.

While many of the above embodiments have been discussed in the context of restaurants and movie theaters, it is understood that other services and establishments could utilize the system for improved customer purchasing experiences. For instance, a clothing store could detect from prior purchases of clothing what type of clothing the customer is likely looking for by detecting what types of clothing were recently purchased. As such, aspects of the invention allow businesses the use of social templates and social signatures to improve the purchasing experience of the customer by using available data in a simple and straightforward way.

Additionally, it should be understood that although some purchases are predictable and repetitive (a morning coffee, filling up the car, etc.), key events can trigger inflection points in these patterns, such as a life event change. One example could be a new job, where a user may be open to a new coffee shop or eatery. Another example could be in the case of an upcoming, or recent, birth of a baby, where ample opportunities for new and different kinds of purchases could be presented.

In one embodiment, immediate social signatures and historical social statistics are used to authorize the actions of the user of a communication device. For instance, the user's known locations (home, work, church, banks), activities (working, shopping, exercising, socializing), driving routes, online activity, calendars, time schedules, and patterns are computed to authorize the immediate undertakings (transactions, physical access, data access, communications) of the user.

Moreover, in this embodiment, certain sensors can provide data for direct identification of the user (for example via image recognition, video recognition, audio recognition, etc.) of the user. In yet another aspect, certain sensors can provide continuity characteristic data for identification of the user (for example via travel routes, daily activities, etc. of the user.

By way of example, a user may leave home or work with the communication device, drive along a familiar route, and arrive at a banking institution with an Automated Teller Machine (ATM). After initiating a manual action with the ATM, such as inserting a banking card, a link between the ATM network and the communication network supporting the user's communication device can be used to provide validation of the user's identification based on direct and/or continuity characteristic data.

A social signature can be indicative of a different type of activity. Events occur when certain motion, location, acoustic and optical criteria are satisfied. For instance, when a location signature has moved to a known room in a house such as a home nursery, the motion signature is static, the optical information indicates a dim room and the acoustic information indicates rhythmic breathing, the social signature is that of the mobile phone user and baby napping. From the identified social signature, the calculating logic 150 selects the social template which is used by the system to select how much information is provided to a category of communicant hoping to access the mobile phone user. The social template would then be programmed to reduce the information to be transmitted based upon user-defined relationships and levels of access.

For instance, where the social signature is that of the mobile phone user and baby napping, the social template is for do-not-disturb-due-to-Mother-and-baby-sleeping could be selected. Examples of the social signature and social hierarchy are set forth in Tables 1 and 2.

TABLE 1 do-not-disturb-due-to-Mother-and-baby-sleeping social signature

| Sensor | Value range |
|---|---|
| Location | 39.78° N, 104.88° W ± 5 m |
| Inertial | 0 m/s$^2$ ± .2 m/s$^2$ |
| Optical | 223 lm ± 15 lm |
| Acoustic | −63 db ± 5 db |

TABLE 2 do-not-disturb-due-to-Mother-and-baby-sleeping social hierarchy

| Social Hierarchy | Information |
| --- | --- |
| First Social Hierarchy Level - Father | Provide information on location, duration of state, and estimate of baby sleep time |
| Second Social Hierarchy Level - Friend | Provide information on baby sleeping |
| Third Social Hierarchy Level - School, Work | Do not disturb except in emergency |
| Fourth Social Hierarchy Level - Strangers | Do not disturb |

In this example, assuming that the location sensor 110 senses the location is at 39.78° N, 104.88° W, the inertial sensor 120 senses no acceleration, the optical sensor 130 senses a light value of 223 lm, and the acoustic sensor 140 senses a sound level of −63 db, the calculating logic 150 uses the created social signature to determine which of the social templates 165 included in the memory 160, is the corresponding social template which can classify do-not-disturb-due-to-Mother-and-baby-sleeping. The selected social signature is then applied against requests for communication either using the calculating logic 150 within the mobile device, or on a server through which such communication must be routed.

Assuming the communication is from the Father, the social template structured to classify the Father in the First Social Hierarchy Level, and allow the Father to know that the mobile device 100 of the Mother is with the baby, the location, for how long, and who is napping (both Mother and Baby or Baby only). In this way, the social template used by the system's classifier provides a high level of information to the Father so that the Father can make an informed choice about whether to place the call, or to instead send an email or text.

Assuming the communication is from the neighbor, the social template is structured to classify the neighbor in a Second Social Hierarchy Level and less information is to be provided. In this case, the social template used by the system's classifier indicates the Baby is sleeping, so that the neighbor or friend can make an informed choice about whether to place the call, or to instead send an email or text, but without being given as much detail as to the location and duration of the social signature.

Assuming the communication is from the office, the social template is structured to classify the office in the Third Social Hierarchy Level and even less information is to be provided but with specific information about when the call would be welcomed. In this case, the social template used by the system's classifier indicates that the mobile phone user does not want to be disturbed, except in an emergency. Thus, when an emergency call is to be made from the school or office, the caller will know that the mobile phone user is available and welcomes such calls. Alternately, where there is no emergency, the caller can make an informed choice about whether to place the call, or to instead send an email or text, but without being given any detail beyond being told to only call in limited circumstance. Thus, an employee would know that the employer would not welcome a routine call, but would be available should an emergency arise.

Assuming the communication is from a stranger, the social template is structured to classify the stranger in a Fourth Social Hierarchy Level and indicate only that the caller is not to be disturbed. While not required in all aspects, the social template could be used by the system to direct any such calls straight into a voice mail to block reception entirely.

However, it is understood that the social hierarchy level could be changed for each social template. For instance, assuming that the Mother is accorded the First Social Hierarchy Level in most social templates, there may be times when the Father does not want the location information to be provided. For instance, assuming the Father is purchasing a gift, the social template could be created to not provide the location information to the Mother (either specifically or to all First Social Hierarchy Level members) in certain locations, and thus create exceptions to the level of information provided in the same or other social templates. Thus, while categories of social hierarchy levels can be established, exceptions can be programmed according to the needs of the end user.

As such, each social template can be set up with varying levels of granularity in so far as who is given which information about the user of the mobile device 100 prior to the call being placed. However, in order to ensure that the social template is accurate, the mobile device 100 includes a social training program 167 stored within the memory 160. Using the social training program 167, the user can save particular sets of social signatures as new social templates' training sets, or increase the accuracy of an existing social template training set using the social signature. While described in terms of four social hierarchy levels, it is understood that additional or fewer levels can be provided, depending on the social template or through user training as will be described below.

Using the above example in relation to the Mother and the Baby, in order to set up the social template in the first instance, the Mother would activate the social training program 167 while in the nursery with the Baby, and the social signature would be associated with that particular social template. Specifically, the data sensed by the location sensor 110, the inertial sensor 120, the optical sensor 130, and the acoustic sensor 140 would be correlated with the new social template, and the Mother would then enter the degrees of information to be provided to various categories of potential callers (i.e., Father, Friend, Neighbor, Office, School, Stranger, etc.). Subsequently, should a caller be given the wrong amounts of information, the Mother could again activate the social training program 167 to improve the classification of social signatures by one or more social templates. In this manner, each social template could be associated with more than one set of social signatures so as to allow for variations from the original detected social signature and to improve the functionality of the mobile device 100.

Once the mobile device 100 assigns the social template associated with the current social signature, the assigned social template is sent to an external server within the mobile network of the caller. As such, when the caller attempts to contact the mobile device 100, the caller is given the information according to the hierarchical social classifications prior to contacting the mobile device 100.

Additionally, the mobile device 100 consistently monitors for a change in the social signature, such as where the mobile device 100 changes location or detects a change in the optical or acoustic levels. At this point, the mobile device 100 will determine whether the social signature indicates a change in the currently assigned social template, or whether another social template is to be assigned. Using the above example, where the social signature indicates that the baby is now awake and crying, the social template would be changed to allow information on the new status of the baby, but likely maintain a do-not-disturb social template.

Figure 2:
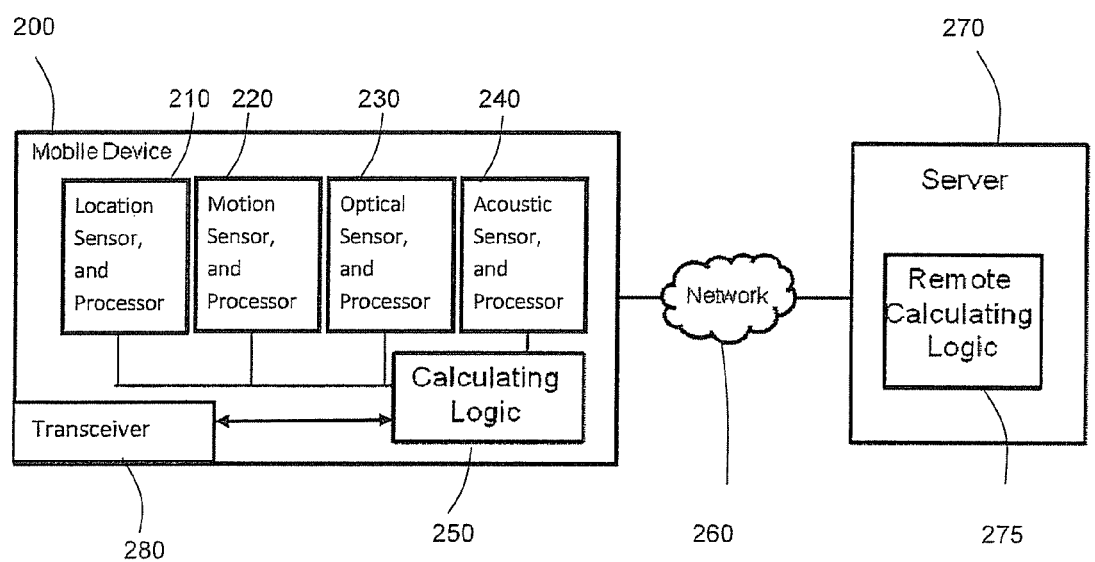
FIG. 2 illustrates a block diagram of a social monitoring system, in accordance with one embodiment of the present invention.

While described in the context of the mobile device 100 having the social templates and social training performed internally, in another embodiment of the invention shown in FIG. 2, the social templates and social training is performed externally. As shown, a mobile device 200 monitors location, acceleration, orientation, audio and optical samples using a location sensor and processor 210, a motion sensor and processor 220, an optical sensor and processor 230, and an acoustic sensor and processor 240 included in the mobile device 200. The location sensor and processor 210 performs generally the same function as the location sensor 110 and location processor 115 of FIG. 1, the motion sensor and processor 220 performs generally the same function as the inertial sensor 120 and motion processor 125 of FIG. 1, the optical sensor and processor 230 performs generally the same function as the optical sensor 130 and optical processor 135 of FIG. 1, and the acoustic sensor and processor 240 performs generally the same function as the acoustic sensor 140 and acoustic processor 145 of FIG. 1. A calculating logic 250 receives the processed data from the location sensor and processor 210, the motion sensor and processor 220, the optical sensor and processor 230, and the acoustic sensor and processor 240, and transmits the processed data to a server 270 using a transceiver 280 via a network 260.

While not required in all aspects, the network 260 can be a wireless communication network such as a CDMA, GSM, or like mobile communication protocols.

The processed data received at the server 270 is classified using one or more social templates stored in a memory included in a remote calculating logic 275 of the server 270. The remote calculating logic 275 provides information conditionally based on the result of classification to a requesting caller via the network 260 according to a hierarchical social classification. In this manner, the assignment and training of the social templates according to social signatures is performed externally at the server 270 instead of within the mobile device 200. The assigned social template is maintained in a server (such as the server 270) through which the caller must access to reach the mobile device 200. As such, when the caller attempts to contact the mobile device 200, the caller is given the information according to the hierarchical social classifications prior to contacting the mobile device 200.

However, it is understood that, while shown as lacking the capability of providing the hierarchical social classification within the mobile device 200, the mobile device 200 could also have this capability locally within the mobile device 200 so as to have an internal and external capability of selectively providing information according to the hierarchical social classification incorporated in the social templates.

Figure 3:
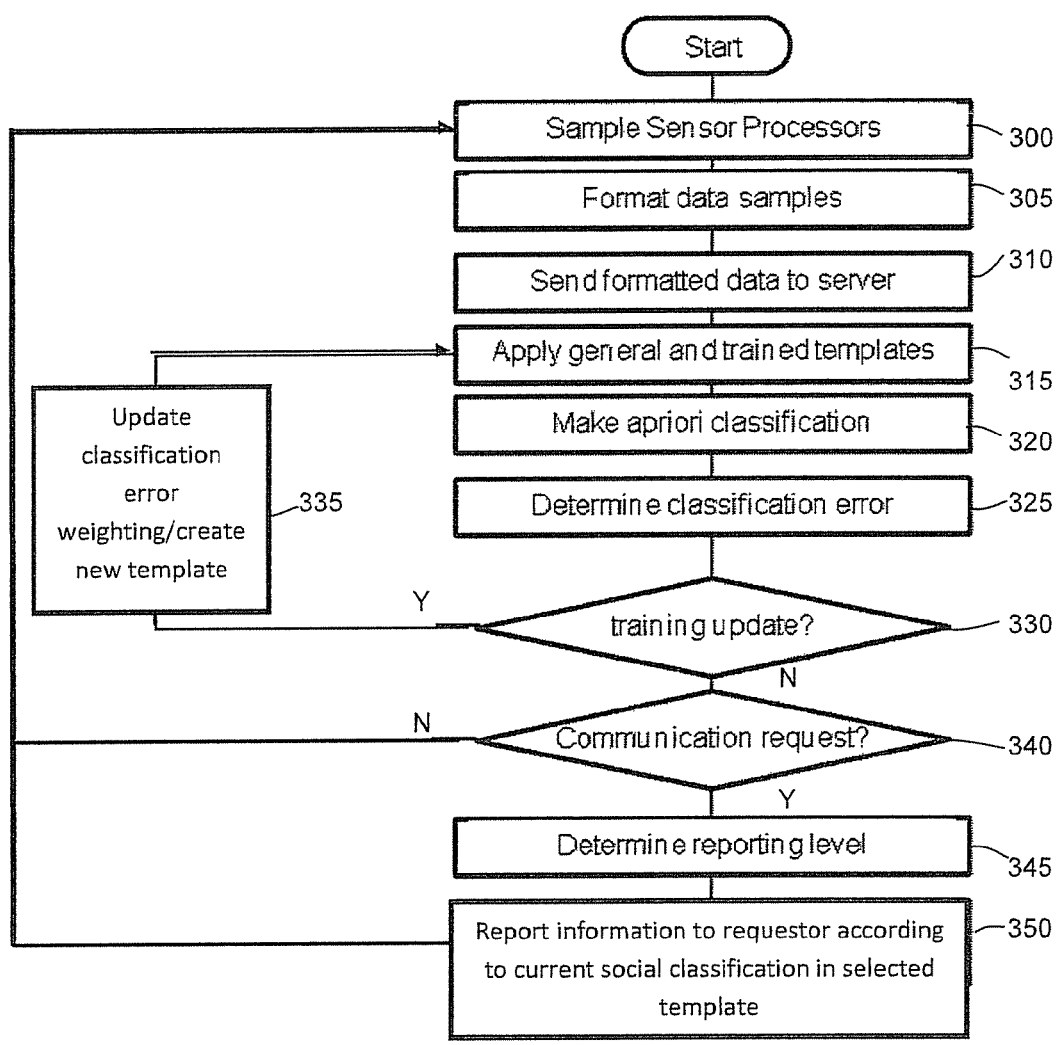
FIG. 3 illustrates a flow diagram for a method of social monitoring using activity sensors in accordance with one embodiment of the present invention.

FIG. 3 illustrates a flow diagram for a method of social monitoring using sensors in accordance an embodiment of the present invention. In operation 300, the sensor data is sampled by the calculating logic 150, 250. In the embodiments of FIGS. 1 and 2, calculating logic 150, 250 detects the data from the location processor 115, 210, the motion processor 125, 220, the optical processor 135, 230, and the acoustic processor 145, 240. The sampling can be performed at preset intervals, or continuously.

In operation 305, the data samples detected by the calculating logic 150, 250 are formatted into social signatures so that the data can be classified using one or more social templates. In operation 310, where the mobile device is not performing a classification of the social signatures with social templates, such as in the embodiment shown in FIG. 2, the calculating logic 250 sends the formatted data to the server 270 across the network 260. However, it is understood that operation 310 need not be performed in all aspects of the invention, such as where the mobile device 100 of FIG. 1 is being used.

In operation 315, the formatted data is indexed to a subset of social templates. In operation 320, the calculating logic 150 or the remote calculating logic 275 makes an a priori assignment of one of the social templates to the formatted data. This a priori classification is based upon a closest correspondence between the social signature in the formatted data and the social signature or signatures associated with each social template.

The calculating logic 150 or the remote calculating logic 275 detects a classification error in operation 325. Since the social signature in the formatted data and the social signature or signatures associated with each social template may not be within a range of correspondence, this difference is a classification error. Conversely, where there the signature is within a range of correspondence, there is no classification error.

By way of example, assuming the mobile device user is at a movie, the location sensor 110 detects the location as that of the movie theatre, and the inertial sensor 120 indicates no movement. Further, the mobile device 100 might include a near field communication (NFC) device which detects that the mobile device 100 was used to purchase a ticket to a movie, and the movie start time. The mobile device 100 might also include a clock which detects that the start time has passed, but the optical sensor 130 determines that the movie theater lights are bright. In contrast, for the social signature associated with a social template for watching a movie, the optical sensor could be for low light, but also include the movie theater location, no acceleration, time being after the start time, and the ticket data from the NFC device. In this instance, the social signature in the formatted data would include a number of matching elements (i.e., location, acceleration, time, and NFC data) which are consistent with the social signature associated with a social template for watching a movie, but the error would exist in relation to the optical data. Thus, in operation 320, the a priori classification would be the social template for watching the movie, and the classification error in operation 325 would be in relation to the optical data being high as opposed to low.

Where there is a classification error, a training update can be optionally performed in operation 330. If the training update is to be performed, the classification error weighting is updated or the social signature is matched to a new social template created by the user in operation 335. According to an aspect of the invention, where there is the classification error such that the training update is needed, the user might be prompted to confirm that the a priori classification is accurate. If the a priori classification is accurate, the classification weights are updated in operation 335 for that particular social template to ensure that the social signature in the formatted data is recognized in the future as being classifiable by the same social template. In contrast, where the a priori classification is not accurate, a new social template can be created. In this manner, the social templates are constantly refined. The updated classification weighting and/or template from operation 335 is stored in the memory 160 or in the server 270.

Using the above example in relation to the social template for watching a movie, the same social template for watching a movie could have an updated error weighting in relation to the relative importance of the lighting, and thus would be associated with more social signatures. In contrast, the user might create a new social template, such as a social template for waiting to watch a movie in which the user would allow more communication.

While not required in all aspects, such updated error weights and new social templates could be generated solely in relation to the user of the mobile device 100, 200, or could also be shared from other mobile devices. In this manner, the social templates could be unique to the user, or be refined through the collective experience of any number of other user experiences.

While not required in all aspects, the training and updating in operations 330, 335 could be performed using Fuzzy Adaptive Resonance, Learning Vector Quantization, or other techniques whereby a computational device learns from detected errors in order to improve future reactions to like sensor inputs.

Where there is no training to be performed (such as where there is no classification error or where the classification error is de minimis), the calculating logic 150 or the remote calculating logic 275 detects whether there has been a communication request to the mobile device 100, 200 in operation 340. Where there is no communication request, the process returns to operation 300 to determine if the social signature has changed.

Where there is a communication request, the calculating logic 150 or the remote calculating logic 275 compares the requestor with the access level assigned to the requestor contained in the selected social template in operation 345. In operation 350, the information level assigned to the requestor is provided to the requestor prior to communication being completed in order for the requestor to determine, based upon the information provided, whether the communication should be completed or whether the mobile device user would not appreciate the call. After reporting the information, the process returns to operation 300 to determine if the social signature has changed.

While described in the context of voice communications, it is understood that the social templates could also be used by the system to prevent other forms of communication, such as text messages, social network updates, emails, instant messages, or other like communications which can be distracting to a user of a mobile device. By way of example, the created social signature might correspond to a user driving a car with a Bluetooth headset. In this case the social template might be used to by the system to provide information to the sender that the user is driving and is not available to read the text message, but should instead be contacted using a voice communication.

Moreover, it is understood that aspects of the invention do not require a communication request to provide the differing levels of information such that operation 340 is optional. By way of example, in aspects of the invention, the social template can be used by the system to log in and send or update specific information to one or more social networking services and/or microblogs. The social template can also include data which specifies how the information resultant from a successful classification of a social signature using the social template should be used, as well as any necessary log in and username information needed to authorize the social networking services and/or microblogs to receive such updates. While not required in all aspects, a detected biometric would be useful in ensuring that the proper account is accessed.

In this manner, the device 100, 200 could chronicle a user's status, and could provide different updates to different social networking services. For instance, a user in a coffee shop might want to update their social networking site (such as FACEBOOK) to indicate to users that they are at the coffee shop. Where the user has more than one social networking site, the user might not want this information on a profession networking site (such as LINKED-IN). Conversely, where the user is in a work related activity, such as at a conference, the social template could be configured to provide the same or different updates on the social and professional networking sites. A similar chronicle of the user's status could be provided on TWITTER or other microblog site. In this way, the device 100, 200 would be able to provide constant feeds and updates to automatically enliven a user's social and professional networking site(s) and/or issue microblogs such as tweets according to a status sensed from the various device sensors 110, 120, 130, 140.

In aspects of the invention, even where a user does not have a social networking service and/or microblog set up, the social template could be configured and used by the system to provide specific information using text, email and/or voice messaging. By way of example, the social template could be designated for emergency situations, and used by the system to automatically provide information to the police, fire department, family and/or friends. Such communication could be through text messages, emails, computer read messages sent to a voice line, and, where social networking and/or microblog services are set up, through updates to such services. In this way, the device 100, 200 would be able to summon help in an emergency situation according to a status sensed from the various device sensors 110, 120, 130, 140.

By way of example, the device sensors 110, 120, 130, 140 could detect a sharp audio sound and a sudden deceleration, and the calculating logic 150, 275 could detect the social signature as being for a car crash. From the social signature for the car crash, the calculating logic 150, 275 would select a social template which can successfully classify the social signature and which conditionally provides information on the time since impact and location of impact to the police and ambulance services, as well as providing an alert to family and/or friends.

By way of another example, the device sensors 110, 120, 130, 140 could detect heat and an optical/acoustic signature consistent with a fire, and the calculating logic 150, 275 could detect the social signature as being for a fire. From the social signature for the fire, the calculating logic 150, 275 would select a social template which can successfully classify the social signature and which conditionally provides information on the likelihood and/or location of a fire to the police and fire department, as well as providing an alert to family and/or friends.

By way of a further example, the device sensors 110, 120, 130, 140 could detect a sudden change in breathing signatures as well as a change in a user's pulse indicative of a heart attack, and the calculating logic 150, 275 could create a social signature for a medical emergency. From the social signature for the medical emergency, the calculating logic 150, 275 would select a social template which can successfully classify the social signature and which conditionally provides information on the type and/or location of a medical emergency to emergency services and/or the fire department, as well as providing an alert to family and/or friends.

While described in terms of a mobile device, it is understood that aspects of the invention need not be limited to a device that can be carried by a user. For instance, the device could be mounted to a moving vehicle and thus not be carried by a user. Further, aspects need not be used in a device which is mobile; for instance, where the device is in a room and observes sensor inputs that change, as in a security system or other system which utilizes sensors.

It will be appreciated by those of ordinary skill in the art that any configuration of the system may be used for various purposes according to the particular implementation. The control logic or software implementing the present invention can be stored in main memory, mass storage device, or other storage medium locally or remotely accessible to processor.

It will be apparent to those of ordinary skill in the art that the system, method, and process described herein can be implemented as software stored in main memory or read only memory and executed by processor. This control logic or software may also be resident on an article of manufacture comprising a computer readable medium having computer readable program code embodied therein and being readable by the mass storage device and for causing the processor to operate in accordance with the methods and teachings herein.

The present invention may also be embodied in a handheld or portable device containing a subset of the computer hardware components described above. For example, the handheld device may be configured to contain only the bus, the processor and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein. Additionally, the device may in some embodiments be non-portable while still capable of fulfilling aspects of the invention.

The present invention may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to a processor. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

While the terms used throughout the foregoing specification should be clear and unambiguous to those of ordinary skill in the art, for the avoidance of doubt the term "offer information" should be understood within the context of this specification to mean data describing one or more opportunities for consideration, including but not limited to one or more opportunities for purchases or sales; one or more suggestions or recommendations; one or more opportunities for introductions; one or more coupons to be used for products or services; one or more notifications of discounts or sales, etc. The term "sensor data" should be understood within the context of this specification to mean physical and/or usage information which has been measured, sampled, synthesized or stored; although the term "sensor data" is used for convenience, it is understood that the data source need not be a literal sensor. The term "social signature" should be understood within the context of this specification to mean information which may include but should not be considered limited to formats, values, properties, representations and/or control information of "sensor data". The term "processing" should be understood within the context of this specification to refer to the application of one or more mathematical arithmetical operations including but not limited to fixed-point, floating-point, real-valued, complex-valued, logical, multiplication, addition, circular buffers, look-up tables, etc. The term "social statistic" should be understood within the context of this specification to mean a representation of one or more properties of a collection of processed or stored sensor data. The term "classification" should be understood within the context of this specification to refer to the application of one or more algorithms including but not limited to Fast Fourier transform (FFT), finite impulse response (FIR) filter, Infinite impulse response (IIR) filter, adaptive filters such as the Wiener or Kalman filters, Neural Networks, statistical, probabilistic algorithms, etc. The term "social template" should be understood within the context of this specification to refer to a set of classification parameters and information for processing of social signatures and/or social statistics. The term "social signature of social template" should be understood within the context of this specification to refer to a relationship between social signatures and social templates. The term "environment" should be understood within the context of this specification to refer to a set conditions or surroundings containing detectable information. The term "purchase" should be understood within the context of this specification to include any receipt of goods and/or services, including but not limited to literal purchases, rentals, loans, or free gifts. It is understood that the use of the term "individual" in the context of identification is not limited to a person, but instead can refer to animals, items, machines, and other single entities. The term "suggestion" should be understood within the context of this specification to mean implanting, in the mind, information so as to influence actions and/or thoughts.

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The above detailed description is, therefore, not to be taken in a limiting sense, and the scope of the present invention is defined only by the appended claims and their equivalents.

In the foregoing specification, the invention has been described with reference to specific exemplary embodiments thereof. It will, however, be evident that various modifications and changes may be made thereto without departing from the broader spirit and scope of the invention, as set forth in the appended claims and their equivalents. The specification and drawings are, accordingly, to be regarded in an illustrative rather than a restrictive sense.

What is claimed is:

1. An apparatus to provide identification, comprising:
   a transceiver that receives information associated with at least one individual, wherein the received information comprises sensor data associated with an environment of a communication device, wherein the sensor data is collected using one or more sensors;
   one or more processors configured to monitor the activity associated with an individual, create one or more social statistics based upon the monitoring, calculate one or more metrics of identification of at least one individual within the environment of the communication device based upon both the received information and one or more social statistics, determine which of a template from one or more templates has the greatest correspondence with the one or more metrics of identification, select a social hierarchy of operations to be performed based on the determined template, the social hierarchy comprising differing levels of operations to be performed based on social levels and the determined template, including at least:
   a first set of one or more operations to be performed using a first data for a first set of target devices within a first social level, and a second set of one or more operations, different from the first set of one of more operations to be performed using a second data for a second set of target devices within a second social level; and
   to perform one or more operations according to the social hierarchy defined by the determined template; and
   a memory associated with the one or more processors.

2. The apparatus of claim 1, wherein the one or more metrics of identification is based on the similarity between the received information and the one or more social statistics.

3. The apparatus of claim 1, wherein the one or more processors create a social signature from the received information,
   determine which of a social template from one or more templates has the greatest correspondence with the social signature, and provide identification information to one or more recipients based on the determined social template.

4. The apparatus of claim 1,
   wherein the monitored activity is at least one selected from the group consisting of: a retail transaction, a financial transaction and a data transaction; and
   the one or more recipients is at least one selected from the group consisting of: a retail service provider, a financial service provider, and a data service provider.

5. The apparatus of claim 4, further comprising
   the one or more recipients includes the communication device.

6. The apparatus of claim 1, wherein
   the monitored activity is at least one selected from the group consisting of: seeking access to a physical location, seeking data access, and seeking authorization; and
   the one or more recipients is at least one selected from the group consisting of: a system controlling access to a physical location, a system controlling access to data, and a system controlling permissions.

7. The apparatus of claim 1, wherein the calculated one or more metrics of identification is associated with at least one selected from the group consisting of: the user of the communication device, a person associated with the user of the communication device, a new association of the user of the communication device, a customer of an establishment, a friend of the user of the communication device, a person who is not the primary user of the of the communication device, a group, and a family member of the user of the communication device.

8. The apparatus of claim 1, wherein the one or more social statistics further comprise at least one selected from the group consisting of: biometrics, purchasing data, user activity, application data, user locations, associated times, computer data, login records, local network signals, ranging data, wireless signals, user's pattern of inputting data, life patterns, habits, travel patterns, usage data, user name, passwords, and active device applications.

9. The apparatus of claim 1, wherein the one or more sensors is at least one selected from the group consisting of: motion sensor, sound, camera, microphone, optical sensor, location, acceleration, angle, audio, biometrics, physiological, respiration, capacitance, density, displacement, distance, electric current, chemical, electric potential, energy, force, facial, finger print, gravity, gyroscopic, inertial, infrared, hand geometry, heart rate, humidity, imaging, level, linear acceleration, light, moisture, magnetic field, navigation, ranging, orientation, photon, position, presence, radiation, radio, retina, speed, thermal, pressure, vector rotation, proximity, voice, speech patterns, phoneme, subatomic particles, temperature, user input, ultrasound, ultraviolet, ultra wideband, usage, vibration, and video.

10. The apparatus of claim 1, wherein the monitoring associated with the individual occurs periodically, with event triggers, continuously, according to determined thresholds, or any combinations thereof.

11. The apparatus of claim 1, wherein the one or more social statistics based upon the monitoring is updated.

12. The apparatus of claim 1, wherein the received information comprises information from sources other than, or in addition to, the communication device.

13. The apparatus of claim 1, wherein the one or more operations further comprises supplying information based on the one or more metrics of identification, wherein the supplied information is one of a coupon, an offer, a suggestion, information, sales item, map, route, options, menu item, or any combination thereof.

14. The apparatus of claim 1, wherein the one or more operations comprises at least one of purchasing, placing an order, verifying, reservation, performing a task, authorize actions, or any combination thereof.

15. The apparatus of claim 1, wherein the one or more operations comprises providing one or more of the calculated metrics of identification to one or more recipients based on the determined social template.

16. A method for providing identification parameters, comprising:
   receiving information associated with at least one individual, wherein the received information comprises sensor data associated with an environment of a communication device, wherein the sensor data is collected using one or more sensors;
   monitoring the activity associated with an individual;

creating one or more social statistics based upon the monitoring;

calculating one or more metrics of identification of at least one individual in the environment of the communication device based upon both the received information and one or more social statistics determining which of a template from one or more templates has the greatest correspondence with the one or more metrics of identification;

selecting a social hierarchy of operations to be performed based on the determined template, the social hierarchy comprising differing levels of operations to be performed based on social levels and the determined template, including at least:

a first set of one or more operations to be performed using a first data for a first set of target devices within a first social level, and a second set of one or more operations, different from the first set of one of more operations to be performed using a second data for a second set of target devices within a second social level; and performing one or more operations according to the social hierarchy defined by the determined template.

17. The method of claim 16, further comprising:

determining which of a social template from one or more templates has the greatest correspondence with the monitored activity;

providing one or more of the calculated metrics of identification to one or more recipients based on the determined social template;

wherein the monitored activity is at least one selected from the group consisting of: a retail transaction, a financial transaction and a data transaction; and the one or more recipients is at least one selected from the group consisting of: a retail service provider, a financial service provider, and a data service provider.

18. The method of claim 16, further comprising:

determining which of a social template from one or more templates has the greatest correspondence with the monitored activity;

providing one or more of the calculated metrics of identification to one or more recipients based on the determined social template;

wherein the monitored activity is at least one selected from the group consisting of:

seeking access to a physical location, seeking data access, and seeking authorization; and the one or more recipients is at least one selected from the group consisting of: a system controlling access to a physical location, a system controlling access to data, and a system controlling permissions.

19. The method of claim 16, wherein the calculated one or more metrics of identification is associated with at least one selected from the group consisting of: the user of the communication device, a person associated with the user of the communication device, a new association of the user of the communication device, a customer of an establishment, a friend of the user of the communication device, a person who is not the primary user of the of the communication device, a group, and a family member of the user of the communication device.

20. The method of claim 16, wherein the one or more social statistics further comprise at least one selected from the group consisting of: biometrics, purchasing data, user activity, application data, user locations, associated times, computer data, login records, local network signals, ranging data, wireless signals, user's pattern of inputting data, life patterns, habits, travel patterns, usage data, user name, passwords, and active device applications.

21. A device to provide identification, comprising:

one or more sensors, wherein the device collects sensor data associated with an environment of the device;

a transceiver which transmits information to a server based on the collected sensor data and receives one or more operations from the server based upon: one or more processors configured to monitor the activity associated with an individual, create one or more social statistics based upon the monitoring, calculate one or more metrics of identification of at least one individual in the environment of the device based upon both the received information from the device and one or more social statistics, determine which of a template from one or more templates has the greatest correspondence with the one or more metrics of identification, select a social hierarchy of operations to be performed based on the determined template, the social hierarchy comprising differing levels of operations to be performed based on social levels and the determined template, including at least:

a first set of one or more operations to be performed using a first data for a first set of target devices within a first social level, and a second set of one or more operations, different from the first set of one of more operations to be performed using a second data for a second set of target devices within a second social level;

a processor which performs one or more of the received operations according to the social hierarchy defined by the determined template; and a memory associated with the processor.

22. The device of claim 21, wherein the monitored activity is at least one selected from the group consisting of: seeking access to a physical location, seeking data access, and seeking authorization.

23. A method to provide identification metrics, comprising:

collecting sensor data associated with an environment of the device;

transmitting information to a server based on the collected sensor data;

receiving one or more operations from the server based upon: one or more processors monitoring the activity associated with an individual creating one or more social statistics based upon the monitoring, calculating one or more metrics of identification of at least one individual in the environment of the device based upon both the received information from the device and one or more social statistics, determining which of a template from one or more templates has the greatest correspondence with the one or more metrics of identification, selecting a social hierarchy of operations to be performed based on the determined template, the social hierarchy comprising differing levels of operations to be performed based on social levels and the determined template, including at least:

a first set of one or more operations to be performed using a first data for a first set of target devices within a first social level, and a second set of one or more operations, different from the first set of one of more operations to be performed using a second data for a second set of target devices within a second social level; and performing one or more of the received operations according to the social hierarchy defined by the determined template.

24. The method of claim 23, wherein the monitored activity is at least one selected from the group consisting of: seeking access to a physical location, seeking data access, and seeking authorization.

* * * * *